United States Patent
Klein

(10) Patent No.: US 8,147,119 B2
(45) Date of Patent: Apr. 3, 2012

(54) CONVENIENCE NECTAR MIXING AND STORAGE DEVICES

(76) Inventor: Arnold Gregory Klein, Sandia Park, NM (US)

( * ) Notice: Subject to any disclaimer, the term of this patent is extended or adjusted under 35 U.S.C. 154(b) by 1684 days.

(21) Appl. No.: 10/200,747

(22) Filed: Jul. 24, 2002

(65) Prior Publication Data
US 2003/0026164 A1    Feb. 6, 2003

Related U.S. Application Data

(60) Provisional application No. 60/309,264, filed on Aug. 2, 2001.

(51) Int. Cl.
*B01F 3/12* (2006.01)
(52) U.S. Cl. ............ 366/130; 119/72; 206/219; 220/533
(58) Field of Classification Search .................. 366/130; 220/212, 254.1, 529, 532–533; 206/219; 222/145.5; 73/426–429; 119/72, 72.5; 141/95
See application file for complete search history.

(56) References Cited

U.S. PATENT DOCUMENTS

| | | | | |
|---|---|---|---|---|
| 580,899 | A * | 4/1897 | Roberts | 220/533 |
| 897,458 | A * | 9/1908 | Dickeson | 73/429 |
| 1,464,273 | A * | 8/1923 | Schopflocher | 206/219 |
| 1,523,136 | A * | 1/1925 | O'Connor | 220/533 |
| 1,885,757 | A * | 11/1932 | Orlopp | 206/219 |
| 2,020,373 | A * | 11/1935 | Petzold, Jr. | 220/533 |
| 2,081,078 | A * | 5/1937 | Watson | 126/373.1 |
| 2,221,024 | A * | 11/1940 | Hood | 220/533 |
| 2,586,925 | A * | 2/1952 | Drengberg | 220/533 |
| 2,634,705 | A * | 4/1953 | Mayes | 119/57.8 |
| 2,645,127 | A * | 7/1953 | Parks | 73/429 |
| 2,764,157 | A * | 9/1956 | Fernandez et al. | 206/221 |
| 2,787,268 | A * | 4/1957 | Greenspan | 206/221 |
| 2,788,912 | A * | 4/1957 | Simonsen | 220/533 |
| 2,793,776 | A * | 5/1957 | Lipari | 206/221 |
| 2,813,649 | A * | 11/1957 | Lipari | 215/11.1 |
| 2,985,333 | A * | 5/1961 | Kirkman | 220/533 |
| 3,200,983 | A * | 8/1965 | Walter | 220/533 |
| 3,221,917 | A * | 12/1965 | De Santo et al. | 220/502 |
| 3,321,097 | A * | 5/1967 | Solowey | 206/221 |
| 3,400,855 | A * | 9/1968 | Alexander | 220/719 |
| 3,658,204 | A * | 4/1972 | Bottger | 220/23.4 |
| 3,877,877 | A * | 4/1975 | Prosen | 422/51 |
| 3,948,105 | A * | 4/1976 | Johnson, Jr. | 73/427 |
| 4,292,846 | A * | 10/1981 | Barnett | 73/427 |
| 4,294,372 | A * | 10/1981 | Onishi | 220/501 |
| 4,301,942 | A * | 11/1981 | Kupperman et al. | 220/592.17 |

(Continued)

*Primary Examiner* — Charles E Cooley
(74) *Attorney, Agent, or Firm* — Robert W. Becker; Louis W. Tompros; Larissa B. Park

(57) ABSTRACT

The Convenience Nectar Mixing and Storage Device consists of a container that is divided proportionately to allow for the precise measuring of the recommended sugar to water ratios used for nectar type bird and butterfly feeders. The device is adapted for supporting a removable divider that separates the container into proportionate volumes, 4 to 1, 6 to 1, and 9 to 1 that correspond to the commonly recommended sugar to water ratios for hummingbird, oriole, and butterfly nectar feeders. The device allows for the water and sugar compartments to be filled to the same "line of sight" level to facilitate the making of precise nectar sugar to water ratios. Once the sugar and water compartments are filled to the same level, the divider is removed to allow for mixing. In the preferred embodiment of the Convenience Nectar Mixing and Storage Devices, the container divider can be used as a stirring implement and lid to cover the container during storage.

10 Claims, 2 Drawing Sheets

U.S. PATENT DOCUMENTS

| | | | |
|---|---|---|---|
| 4,436,215 A * | 3/1984 | Kleinert et al. | 220/533 |
| 4,577,773 A * | 3/1986 | Bitel | 220/533 |
| 4,722,453 A * | 2/1988 | Hamilton | 220/533 |
| 5,299,688 A * | 4/1994 | McKay et al. | 206/425 |
| 5,447,245 A * | 9/1995 | Merhar | 215/6 |
| 5,615,797 A * | 4/1997 | Ripamonti | 220/529 |
| 5,634,714 A * | 6/1997 | Guild | 366/130 |
| 5,875,888 A * | 3/1999 | Albisetti | 206/221 |
| 6,736,536 B2 * | 5/2004 | Jacobs et al. | 366/130 |
| 6,811,299 B2 * | 11/2004 | Collier | |

* cited by examiner

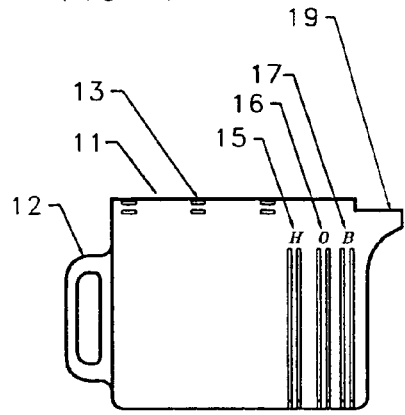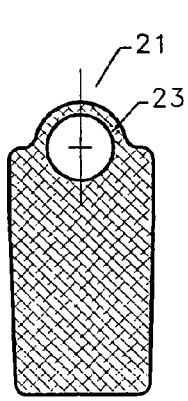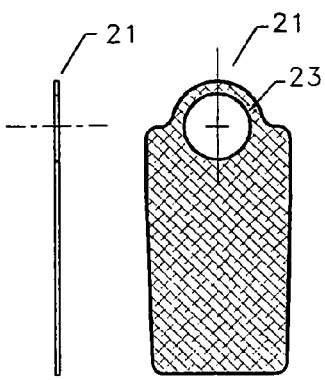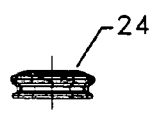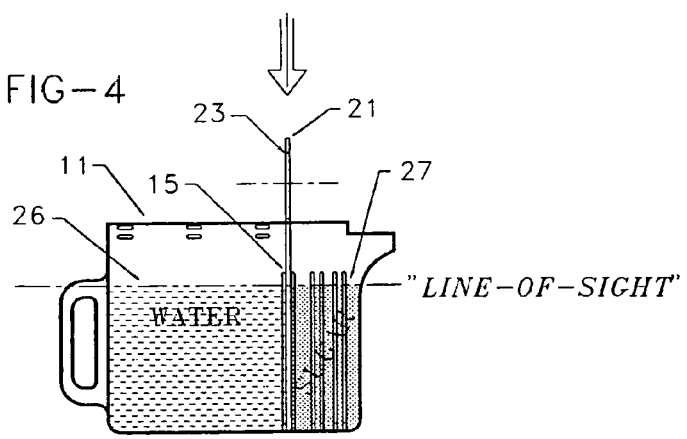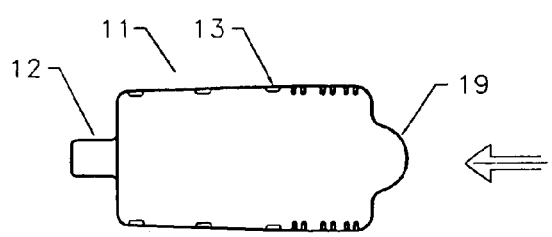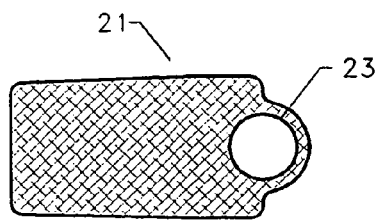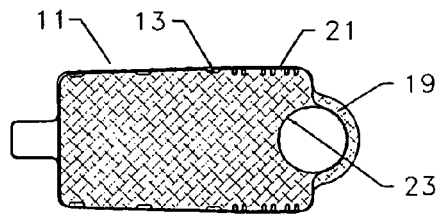

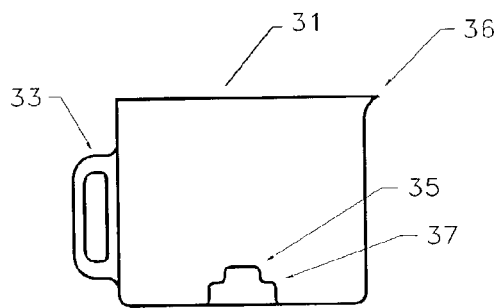
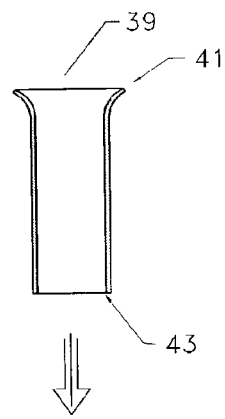
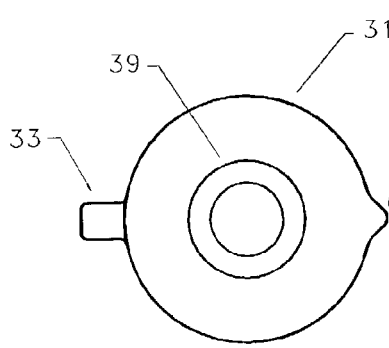
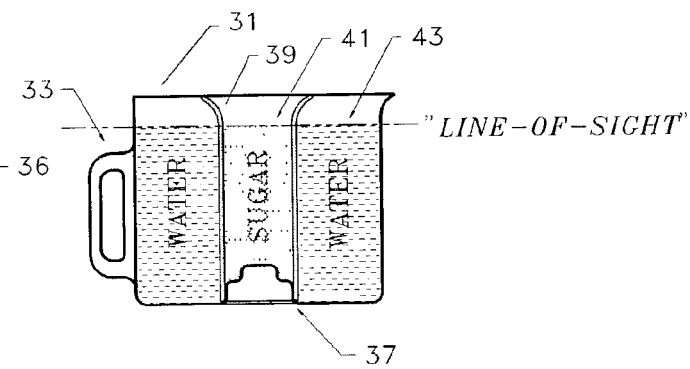
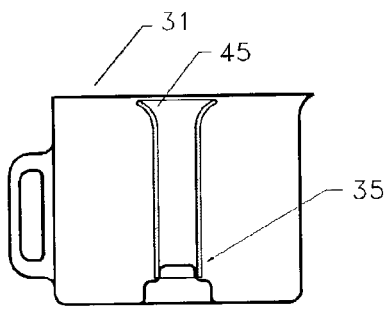

CONVENIENCE NECTAR MIXING AND STORAGE DEVICES

I claim the benefit of provisional patent application No. 60/309264 filed Aug. 2, 2001.

FIELD OF THE INVENTION

The present invention relates to a device to be used to mix and store sugar water (nectar) for nectar type bird and butterfly feeders. The present invention allows for conveniently measuring, mixing and storing the precise proportions of sugar and water required for hummingbird, oriole and butterfly nectar feeders.

BACKGROUND OF THE INVENTION

The popularity of nectar type feeders (sugar-water) for the feeding of hummingbirds, orioles and even butterflies is ever increasing. At the same time, there is extensive research showing that certain sugar to water proportions are preferred by the birds and butterflies, these proportions being more or less equivalent in sugar content with their natural food sources.

As anyone in the nectar feeder manufacturing and or bird feeding specialty retailing business will attest, customers (consumers) are constantly asking and needing to be reminded about correct nectar (sugar to water proportions) recipes and how they should prepare the nectar for their feeders. Further, there are increasing concerns among bird feeding authorities that feeding birds with nectar that is disproportionately sweeter (higher sugar to water ratio) than their natural food sources may have an adverse effect on the birds health if used over the long term. There are similar concerns about using the commercially available nectar concentrates which have concentrated artificial coloring and/or flavorings.

There is clearly a need for a device to simplify the mixing of sugar and water to arrive at the correct sugar to water proportion for hummingbird, oriole and butterfly nectar feeders. At the present time, the currently recommended sugar to water proportions are:

Hummingbird Feeder Nectar—1 part table sugar to 4 parts water
Oriole Feeder Nectar—1 part table sugar to 6 parts water
Butterfly Feeder Nectar—1 part table sugar to 9 parts water These nectar (sugar to water) proportions are currently recognized as being proportionally equivalent in sugar content as the birds, and butterflies natural nectar food sources. As research continues, adjustments to these proportions may be recommended.

The principal object of the present invention is to provide a device for a nectar mixing and storage that simplifies and makes convenient getting the correct proportion of sugar to water ratios(s) for the various types of nectar feeders, hummingbird, oriole, and butterfly. An additional objective of the present invention is to allow the user to prepare a relatively large quantity of nectar, that can be stored in a refrigerator, without concern for spoilage for several weeks.

SUMMARY OF THE INVENTION

A nectar mixing and storage device that simplifies the proportionate measurement of sugar and water for bird and butterfly nectar feeders. The nectar mixing and storage device has separate compartments that are used to measure out the required amounts of sugar to water needed to make hummingbird (1 part sugar/4 parts water), oriole (1 part sugar/6 parts water) and butterfly (1 part sugar/9 parts water) nectar. The device allows for precise sugar to water mixtures based on filling the divided compartments to the same level. Once the sugar and water have been filled to the same level, the compartment divider is removed and the sugar and water may be stirred. In the preferred embodiment, the divider is placed in the appropriate position as indicated by graphics or other means to divide the compartments for the convenient preparation of hummingbird, oriole or butterfly nectar. In the preferred embodiment of the device, the compartment divider can be used as a stirring implement and lid to cover the contents.

Other and further objects of the present invention will be apparent from the following description and claims, and are illustrated in the accompanying drawings, which by way of illustration, show a series of embodiments of the present invention and the principles thereof, and what is now considered to be the best mode in which to apply these principles. Other and different embodiments of the invention embodying the same or equivalent principles may be used and structural changes may be made as desired by those skilled in the art without departing from this invention.

BRIEF DESCRIPTION OF THE DRAWINGS

FIG. 1 depicts an oblique side view of the convenience nectar mixing and storage device;

FIGS. 2A and 2B depict side and top views of the lid/divider for the convenience nectar mixing and storage device;

FIG. 3 depicts a side view of a stopper for the lid/divider for the convenience nectar mixing and storage device;

FIG. 4 depicts a side view showing the lid/divider installed and the sugar water level of the convenience nectar mixing and storage device;

FIG. 5 depicts a top view of the convenience nectar mixing and storage device;

FIG. 6 depicts a top view of the lid/divider for the convenience nectar mixing and storage device;

FIG. 7 depicts a top view of the convenience nectar mixing and storage device with the lid installed;

FIG. 8 depicts a side view of a second embodiment of the convenience nectar mixing and storage device;

FIG. 9 depicts side view of a removable sugar container/divider of the second embodiment of the convenience nectar mixing and storage device;

FIG. 10 depicts a top view of the second embodiment of the convenience nectar mixing and storage device;

FIG. 11 depicts a side view showing the sugar container divider installed and the sugar/water level of the second embodiment of the convenience nectar mixing and storage device;

FIG. 12 depicts a side view of the second embodiment of the convenience nectar mixing and storage device with a smaller sugar container divider as would be used for oriole and/or butterfly nectar.

DESCRIPTION

The first embodiment of the CONVENIENCE NECTAR MIXING AND STORAGE DEVICE is shown in the FIGS. 1-7. The device 11 shown in side view (FIG. 1) has a handle 12 and pouring spout 19. The device 11 has a series of rails as shown at 15, 16 and 17 that when engaged with the divider 21 (FIGS. 2A and 2B) will allow for the creation of two (2) separate compartments within the device. The separate compartments as shown in FIG. 4 will allow for separating the sugar 27 and water 25 components in the device 11. The rails 15, 16 and 17 are located to divide the device 11 into proportionate volumes of 4 to 1 "H"(hummingbird), 6 to 1 "O" (oriole),and 9 to 1 "B" (butterfly) respectively. The rails 15, 16 and 17 may be identified through decoration or embossment for hummingbird nectar, oriole nectar, and butterfly nectar respectively.

Using the device 11, it is now a very simple procedure to mix the correct sugar to water ratio for the nectar feeder type. The divider 21 is pushed down into the appropriate rail 15, 16 or 17. The sugar is added to the smaller side and the water is added to the larger side—both levels being on the same "LINE-OF-SIGHT" as shown in FIG. 4. The divider 21 may be made from a semi-resilient material to aid in sealing between the compartments.

Once the sugar 27 and water 25 are put in the device 11, the divider 21 is pulled out and may be used to stir the solution. The divider 21 can then be used as a lid for the device 11 as shown in FIGS. 5-7. The divider 21 is configured to engage between the raised nodes 13 as shown in FIGS. 5,7. The divider 21 is shown with a pouring hole 23 that aligns with the device 11 pouring spout 19 to facilitate pouring. Finally, the divider 21 with hole 23 may be closed with a separate or integrally formed resilient plug 24 as shown in FIG. 3.

An alternate embodiment of the convenience nectar making and storage device is shown in the FIGS. 8-12. The device 31 has a handle 33 and pouring spout 36. This device 31 has a raised bottom feature as shown at 37 designed to form an interference fit with the bottom of a tubular form divider 39. The divider 39 has a flared top as shown at 41 to facilitate filling. The device is used as shown in FIG. 10 and FIG. 11 by engaging the bottom of the tubular divider 39 with the raised bottom feature 37 to create two (2) proportionate chambers in the device 31. The tubular form divider 39 may be formed of a semi-resilient material to facilitate its fit and seal with the raised bottom feature 37. It is then a simple matter to fill the tubular divider 39 with sugar 41 and to fill the surrounding container with water 43 to the same "LINE-OF-SIGHT" level. The tubular divider 39 is sized to create a sugar 41 to water 43 proportion of 1 to 4 as recommended for hummingbird feeders. Once the water 43 and sugar 41 are added into the device the tubular divider 39 is pulled out, and the nectar solution is stirred. FIG. 12 shows a smaller tubular divider 45 sized to engage with the upper portion 35 of the device 31 raised bottom feature 37. This smaller sized tubular divider 45 is intended to show the relatively smaller sugar to water ratio as used for an oriole or butterfly feeder. The CONVENIENCE NECTAR MIXING AND STORAGE DEVICE of FIGS. 8-12 may be configured to fit up to three (3) different sizes of tubular dividers to allow for convenient mixing of hummingbird, oriole, or butterfly nectar. It should be noted that in any embodiment of the CONVENIENCE NECTAR MIXING AND STORAGE DEVICE(S), the container and associated divider may have graduation marks to assist in setting the same level for the water and sugar. Since it is usually recommended that the nectar solutions be boiled to preserve them longer from spoilage and the development of molds, the CONVENIENCE NECTAR MIXING AND STORAGE DEVICE(S) should be constructed of heat resistant materials and preferably these materials should be compatible with microwave heating.

It should be noted that a CONVENIENCE NECTAR MIXING AND STORAGE DEVICE(S) that are "not-compartmentalized" but which use graphics or embossing to designate the "sugar-fill- level" and resultant mixed sugar-water or "fill to" (full) level are anticipated by this invention. A CONVENIENCE NECTAR MIXING AND STORAGE DEVICE of this type would have different "sugar-fill-level" graphics on 2 or 3 sides/locations to make the three (3) standard nectar (sugar-water) ratios.

The non-compartmentalized CONVENIENCE NECTAR MIXING AND STORAGE DEVICE(S) would by necessity require that a full batch of nectar be prepared every time. It should also be pointed out that a "non-compartmentalized" CONVENIENCE NECTAR MIXING AND STORAGE DEVICE(S) will not be as inherently accurate in controlling the nectar (sugar to water) mix ratios(s)—as the device "sugar-fill-line" would typically cover a larger area at the bottom of the device.

The foregoing description is not intended to be all inclusive of the embodiments that a CONVENIENCE NECTAR MIXING AND STORAGE DEVICE may have. The device itself, once disclosed, may be configured in a variety of embodiments that operate similarly to those detailed and described herein. I desire therefore, that my protection be limited, not by the constructions illustrated and described, but only by the proper scope of the appended claims.

I claim:

1. A convenience nectar mixing device for use in preparation of sugar-water nectar for feeding hummingbirds, orioles or butterflies, said device comprising:
    a container that is adapted to receive water,
    receiving means fixed to said container, and
    a divider movably held by said receiving means for forming a compartment within said container, wherein said compartment has a volume that is proportionately less than a volume of said container, by a ratio established for the formulation of sugar-water nectar for hummingbirds, orioles or butterflies, wherein said compartment is adapted to receive sugar, and wherein removal of said divider from said receiving means allows mixing of said sugar and water to occur to provide said sugar-water nectar.

2. A device according to claim 1, wherein said receiving means are at least one set of rails for receiving said divider.

3. A device according to claim 2, wherein further receiving means are fixed to said container for receiving said divider as a lid for said container.

4. A device according to claim 3, wherein said divider is provided with a pouring hole.

5. A device according to claim 4, wherein a plug is provided for closing off said hole of said divider.

6. A device according to claim 1, wherein said receiving means is a raised element disposed on a base of said container for receiving said divider.

7. A device according to claim 6, wherein said divider is a tubular member.

8. A device according to claim 7, wherein said raised element has a stepped configuration to receive differently sized dividers.

9. A device according to claim 1, wherein said container is provided with a handle and a pouring spout.

10. A device according to claim 1, wherein the ratio of the volume of said compartment to the volume of said container is selected from the group consisting of approximately one to four, approximately one to six, and approximately one to nine.

* * * * *